US012000622B2

(12) United States Patent
Schatz et al.

(10) Patent No.: US 12,000,622 B2
(45) Date of Patent: Jun. 4, 2024

(54) ELECTRIC FLUID FLOW HEATER WITH STABILISATION BRACE

(71) Applicant: Kanthal GmbH, Mörfelden-Walldorf (DE)

(72) Inventors: Stefan Schatz, Mörfelden-Walldorf Hessen (DE); Markus Mann, Mörfelden-Walldorf Hessen (DE)

(73) Assignee: Kanthal GmbH, Mörfelden-Walldorf (DE)

( * ) Notice: Subject to any disclaimer, the term of this patent is extended or adjusted under 35 U.S.C. 154(b) by 1025 days.

(21) Appl. No.: 16/770,101

(22) PCT Filed: Dec. 7, 2018

(86) PCT No.: PCT/EP2018/083967
§ 371 (c)(1),
(2) Date: Jun. 5, 2020

(87) PCT Pub. No.: WO2019/110799
PCT Pub. Date: Jun. 13, 2019

(65) Prior Publication Data
US 2020/0386443 A1 Dec. 10, 2020

(30) Foreign Application Priority Data
Dec. 8, 2017 (EP) .................................... 17206200

(51) Int. Cl.
*F24H 3/04* (2022.01)
*F24H 3/00* (2022.01)
(Continued)

(52) U.S. Cl.
CPC ........... *F24H 3/002* (2013.01); *F24H 9/0057* (2013.01); *F24H 9/1863* (2013.01); *H05B 3/06* (2013.01);
(Continued)

(58) Field of Classification Search
None
See application file for complete search history.

(56) References Cited

U.S. PATENT DOCUMENTS 1,001,654 A * 8/1911 Kratt .................... F24H 3/0405
392/494
1,727,584 A 9/1929 Carleton
(Continued)

FOREIGN PATENT DOCUMENTS

CN 102811514 A 12/2012
DE 1615278 A1 7/1970
(Continued)

OTHER PUBLICATIONS

Office Action dated Feb. 21, 2023, issued in corresponding Korean Patent Application No. 10-2020-7016008.
(Continued)

*Primary Examiner* — Joseph M. Pelham
(74) *Attorney, Agent, or Firm* — Morgan, Lewis & Bockius LLP

(57) ABSTRACT

An electric heater to heat a flow of a fluid having a jacket block comprising a plurality of longitudinal bores to allow the through-flow of a gas phase medium. An elongate heating element extends through each of the bores that together with the jacket block define a heating assembly to heat the gas. The heating assembly is positionally stabilised within the electric heater via at least one brace configured to inhibit undesirable independent axial and/or lateral movement of the heating assembly within the electric heater.

19 Claims, 5 Drawing Sheets

(51) Int. Cl.

| | |
|---|---|
| ***F24H 9/00*** | (2022.01) |
| ***F24H 9/1863*** | (2022.01) |
| ***H05B 3/06*** | (2006.01) |
| ***H05B 3/42*** | (2006.01) |
| ***H05B 3/44*** | (2006.01) |

(52) U.S. Cl.

CPC ......... *H05B 3/42* (2013.01); *H05B 2203/004* (2013.01); *H05B 2203/022* (2013.01)

(56) References Cited

U.S. PATENT DOCUMENTS

| | | | | |
|---|---|---|---|---|
| 1,884,086 | A * | 10/1932 | Stuart | B03C 3/014<br>315/117 |
| 2,619,579 | A | 11/1952 | Cartinhour | |
| 4,016,403 | A * | 4/1977 | Best | H05B 3/64<br>373/134 |
| 4,233,494 | A | 11/1980 | Pawlik et al. | |
| 9,867,232 | B2 * | 1/2018 | Mann | H05B 3/48 |
| 11,692,738 | B2 * | 7/2023 | Gotoh | H05B 3/44<br>392/373 |
| 2007/0235444 | A1 * | 10/2007 | Lewin | H05B 3/44<br>219/602 |
| 2018/0098385 | A1 * | 4/2018 | Mann | F24H 3/002 |
| 2020/0386442 | A1 * | 12/2020 | Gotoh | H05B 3/44 |
| 2022/0178584 | A1 * | 6/2022 | Mann | F28F 1/022 |
| 2023/0030980 | A1 * | 2/2023 | Beall | B01D 53/9454 |

FOREIGN PATENT DOCUMENTS

| | | | | |
|---|---|---|---|---|
| DE | 2732133 | A1 | 1/1979 | |
| EP | 2926623 | B2 | 5/2019 | |
| JP | S54-21642 | A | 2/1979 | |
| JP | H07-320850 | A | 12/1995 | |
| JP | H08-338587 | A | 12/1996 | |
| JP | 2003-148806 | A | 5/2003 | |
| KR | 10-2012-0105691 | A | 9/2012 | |
| KR | 10-2016-0085921 | A | 7/2016 | |
| WO | 2005006812 | A1 | 1/2005 | |
| WO | WO-2021191155 | A1 * | 9/2021 | H05B 3/42 |

OTHER PUBLICATIONS

Office Action dated Nov. 1, 2022, issued in corresponding Japanese Patent Application No. 2020-531077.

International Search Report and Written Opinion dated Feb. 15, 2019, issued in corresponding International Patent Application No. PCT/EP2018/083967.

* cited by examiner

ELECTRIC FLUID FLOW HEATER WITH STABILISATION BRACE

FIELD OF INVENTION

The present invention relates to an electric heater to heat a flow of a fluid, and in particular although not exclusively, to an electric heater having at least one brace to inhibit lateral and/or axial movement of a heating assembly configured to transfer heat energy from a heating element to the fluid.

BACKGROUND ART

Electric heaters for heating gases to high temperatures typically include a tube adapted for the through-flow of a gas and an electrical heating element positioned within the tube to transfer heat to the gas as it flows into an open first end of the tube, passed the wire and then out of the tube via an open second end.

Conventionally, relatively fine wires are wound in a spiral configuration within the tube such that the heating effect is achieved by passing current through the wires as the gas flows through the tube. Accordingly, the effectiveness of the conversion of the electrical energy into heat (via the heating wire) depends for example on the available electrical voltage applied and the resistance of the wire. Accordingly, the effectiveness of the electric heater is dependent, in part, on the maximum temperature achievable by the wire, the flow resistance and the surface area available for heat exchange. Typically, maximum gas temperatures that may be achieved with conventional electric process heaters may be of the order or around 700 to 900° C. However, the higher the temperature the greater the tendency for fracture and failure of the wire.

More recently, EP 2926623 discloses an electric flow heater in which the heating wire is replaced with a heating rod having a defined cross-sectional ratio between that of the rod and the tubular bore through which the rod extends. A single heating element extends through multiple bores (formed within elongate tubular elements) via a plurality of bent (or looped) ends. Gas heating temperatures of up to 1200° C. are disclosed.

The heating wire and jacket block may typically be defined as a heating assembly that is at least partially encapsulated or surrounded by a casing. As the gas is forced into the heating assembly under pressure and is required to flow through very narrow gaps (between the heating element and the inner surface defining the bores) the collective heating assembly is often observed to shift and/or be deflected due to the pressure drop between 'cool' and 'hot' ends of the assembly. This phenomenon is even more pronounced when the heating assembly is orientated vertically such that gravitational forces further contribute to the stresses and physical demands on the assembly. Axial and/or lateral deflection of the heating block relative to the heating element results in repeated contact between the heating element and the edges of the entrance and exit openings of the jacket block leading to local overheating, damage and breakage of the heating element. In order to enhance the heating effect, higher gas flow speeds and larger pressure differentials are employed that further increase the magnitude of the movement and vibration of the components of assembly. This in turn increases the stress and fatigue of the heating assembly components and accelerates wear. Accordingly, what is required is an electric flow heater that addresses these problems.

SUMMARY OF THE INVENTION

Accordingly, it is an aspect of the present invention to provide an electric flow heater to heat a fluid and in particular a gas (gas phase medium) capable of achieving modest to high heating temperatures of the order of 700° C., 1000° C. and potentially up to 1200° C. with minimised physical stress, fatigue and damage at the components of a heating assembly (within the electric heater) so as to greatly enhance the service lifetime of the heater. It is a further objective to stabilise the heating assembly components and in particular a jacket block that surrounds and at least partially encapsulates an elongate heating element such that the jacket block is inhibited and preferably prevented from independent movement both axially and laterally relative to the heating element and/or a casing that surrounds the heating assembly.

It is a further specific aspect to positionally stabilise individual jacket elements assembled together to form a collective jacket block (having a plurality of longitudinally extending bores or channels), and to minimise independent movement of the heating assembly (including the jacket block and the heating element) relative to the surrounding casing. Accordingly, it is a specific objective to provide an electric heater capable of operating to achieve high heating temperatures of the order of 1000° C. or up to 1200° C. whilst withstanding high gas flow velocities with large pressure differentials across the heating assembly (relative to a gas entry and a gas exit ends of the heating assembly).

The aspects are achieved via an electric fluid flow heater having at least one brace connected to or projecting from the casing to contact the jacket block and inhibit axial and/or lateral movement of the block relative to the casing.

According to a first aspect of the present invention there is provided an electric heater to heat a flow of a fluid comprising: at least one axially elongate jacket element defining an axially elongate jacket block having first and second lengthwise ends; a plurality of longitudinal bores or channels extending internally through the jacket block and being open at each of the respective first and second lengthwise ends; at least one heating element extending axially through the bores or channels, the at least one heating element and the jacket block forming a heating assembly; a casing positioned to at least partially surround the heating assembly; characterised by: at least one brace connected to or projecting from the casing to contact the jacket block to inhibit axial and/or lateral movement of the jacket block relative to the casing.

Reference within this specification to 'at least one axially elongate jacket element' and 'axially elongate jacket block' encompass a cover, a sleeve and other jacket-type elements having a length that is greater than a corresponding width or thickness so as to be 'elongate' in an axial direction of the heater. Reference to such 'elongate' elements and blocks encompasses bodies that are substantially continuously solid between their respective lengthwise ends and that do not comprise gaps, voids, spacings or other separations or between the lengthwise ends.

Preferably, the elongate jacket elements and elongate jacket blocks are substantially straight/linear bodies comprising at least one respective internal bore to receive straight or linear sections of heating element. Accordingly, the present jacket elements and jacket blocks is configured to substantially encase surround, cover, house or contain the straight/linear sections of the heating element substantially along the length of the straight/linear sections between bent or curved end sections of the heating element. Accordingly, it is preferred that the bent or curved sections of the heating element only project from and are not covered or housed by the heating element/jacket block.

Accordingly, reference within this specification to 'jacket' element and 'jacket' block encompass respective hollow bodies to contain, house, surround or jacket a heating element substantially continuously between the bent or curved end sections of the heating element that project from the respective lengthwise ends of the jacket element/block.

The effect of elongate jacket element and jacket block having a corresponding axially elongate internal bore is to maximise the efficiency of thermal energy transfer between the heating element and the fluid flowing through the bore in close confinement around the heating element. The lengthwise elongate configuration of the heating element and block provides that the flowing fluid is appropriately contained within the bore around the heating element substantially the full length of the straight/linear section of heating element.

Within this specification, reference to the respective first and second lengthwise ends of a heating element that emerges from the bores or channels within the elongate heating element/jacket block, may be considered to be distinguished from the straight/linear sections of heating element that are housed continuously within the bore of the element/block. As will be appreciated, almost all of the thermal transfer between heating element and fluid occurs within the elongate bore(s).

Optionally, the brace may comprise a single component or may be formed from multiple components. Optionally, the brace may be configured to contact the jacket block at a single region or multiple regions.

According to one embodiment of the invention as defined hereinabove or hereinafter, the casing comprises an outer sheath that surrounds the heating assembly and the at least one brace extends radially between the sheath and the jacket block. More preferably, the casing comprises at least one spacer extending radially from the sheath and towards the jacket block, the brace mounted at or extending from the spacer to contact the jacket block. Preferably, the spacers are formed as disc-like components mechanically attached to an inside surface of the sheath via welding. Optionally, the spacers may be formed integrally with the sheath and may be connected, fused or adhered to the sheath via chemical or mechanical attachment means.

Optionally, the brace comprises at least one component configured to extend into and through the jacket block to enhance the positional stabilisation of the heating assembly. Optionally, the brace comprises at least one rod or bar member configured to extend into and through the jacket block. Preferably, the brace comprises a plurality of rods extending into and through the jacket block at regions between the longitudinal bores or channels. Optionally, the rods extend partially into not entirely through the jacket block. More preferably, the brace further comprises at least one shoulder block to make contact with the jacket block. Preferably, the brace (i.e., the shoulder block) is positioned at or towards a radially inner region of the at least one spacer. Optionally, the brace may comprise at least a pair of the shoulder blocks positioned at opposite lateral sides of the jacket block and a plurality of rods mounted at and extending between the shoulder blocks to extend through the jacket block. According to specific implementations, the electric heater may comprise at least a first pair of shoulder blocks positioned at lateral sides of the jacket block; a first set of the braces (e.g., rods) extending through and across the jacket block between the shoulder blocks and a second set of the braces (e.g., rods) extending through the jacket block perpendicular to the first set of the rods.

The shoulder block (or a plurality of blocks) is configured to abut an external surface of the jacket block in touching contact such that this frictional engagement positionally stabilises the jacket block both axially and laterally relative to the casing. Where the present invention comprises a plurality of oppositely arranged shoulder blocks (positioned at each lateral side of the jacket block), the jacket block may be considered to be sandwiched between the shoulder blocks that are, in turn, rigidly mounted to the casing via the at least one spacer. As will be appreciated and according to further embodiments, the shoulder block may be attached directly to the casing or may be formed integrally with the casing so as to project inwardly from the casing to make contact with the external surface of the jacket block. Preferably, to further enhance the positional stabilisation of the heating assembly, the brace comprises a plurality of rods that extend through the heating assembly in addition to the one or plurality of should blocks to contact at least one region of the external surface of the heating assembly. According to preferred implementations, the electric heater comprises a first pair of shoulder blocks and a first set of the rods extending through the jacket block; and a second pair of the shoulder blocks and a second set of the rods extending through the jacket block; wherein the second pair of shoulder blocks are positioned at different lateral sides of the jacket block relative to the first pair and the second set of rods extends generally perpendicular to the first set of the rods.

The at least one rod, optionally being a first and second set of rods preferably extend through respective channels (or bores) that in turn extend through the jacket block being aligned perpendicular to the longitudinal bores through which the heating element extends. The bores to receive the rods pass between and do not interfere with the longitudinally extending bores that would otherwise interfered with the longitudinal gas flow through the bores (or channels) from the cool to the hot end of the electric heater during use.

According to one embodiment of the invention as defined hereinabove or hereinafter, the first pair of shoulder blocks and the second pair of shoulder blocks are positioned at different regions along a length of the jacket block between the lengthwise ends. This configuration provides that the first and second set of rods do not interfere with one another in addition to axially distributing the stabilising effect provided by the different pairs and sets of shoulder blocks and rods, respectively. Preferably, the jacket block comprises a plurality of cross bores or channels extending generally perpendicular to the longitudinal bores to receive at least part of the brace (i.e., the rods).

The present arrangement is advantageous to maximise the extent and efficiency of thermal energy transfer between the heating element and the fluid by providing unobstructed fluid flow within the elongate bore(s) between the respective lengthwise ends of the elongate jacket element/block. Accordingly, the positional support brace, shoulder blocks, rods etc., that positionally stabilise the jacket block do not interfere with the fluid flow and therefore energy transfer efficiency. In particular, the brace (and associated components) do not contact the heating element at the linear straight section between the respective curved/bent end sections of the heating element.

Preferably, the terminal ends of the heating element enter into and exit from the same end of the tubular elements/ jacket block, which is typically the 'cool' end (ambient or lower temperature) into which the gas flows relative to a 'hot' end (around 1000° C.) from which the heated gas emerges. Both terminal ends of the heating element may then be connected to corresponding terminals in order to apply voltage and accordingly heat the gas flowing through the gap defined between the heating element and the inner surface defining each bore.

Optionally, the electric heater comprises a plurality of jacket elements assembled together as a unitary body. The unitary body may be held together via the spacers that are positioned to surround in touching, partial touching or near touching contact with the external surface of the jacket block.

According to one embodiment of the invention as defined hereinabove or hereinafter, the jacket elements comprise at least a first and second groove indented at external surfaces of the jacket element such that the first and second grooves of neighbouring or adjacent jacket elements align to define one of the respective channels to receive at least a portion of the brace (i.e., the rod).

Optionally, the jacket elements comprise a projection at a first region and a groove at a second region of at least one external surface, the projection of one of the jacket elements configured to at least partially sit within the groove of an adjacent jacket element to at least partially interlock the jacket elements. Such an arrangement is advantageous to prevent independent axial and lateral movement of the jacket elements relative to one another and/or the heating element extending within the longitudinal bores. Optionally, an external surface of the jacket elements comprise a polygonal or rectangular outer cross-sectional profile. The jacket elements via their external shape profile are capable of sitting in close touching contact with one another as a collective block. Where the jacket elements comprise means for interlocking such as tongue/projection and groove arrangements, the tongue/projection and the grooves are provided at different side faces of each respective jacket element.

According to preferred embodiments, the casing and the at least one spacer comprise a metal material. Preferably, the at least one jacket element and at least part of the brace comprise a non-electrically conducting material such as a refractory or ceramic material.

Preferably, the rods may comprise a metal (core) optionally partly or entirely surrounded or coated by a refractory or ceramic material such that the rods are non-electrically conducting. Preferably, the shoulder block may be formed from metal. Alternatively, the shoulder block may be formed from a refractory or ceramic material.

According to a preferred embodiment, the electric heater comprises a plurality of jacket elements assembled together in touching contact with one another to define the elongate jacket block, each of the plurality of longitudinal bores extending respectively through each of the jacket elements; the brace comprising: at least a pair of shoulder blocks positioned at opposite lateral sides of the jacket block and a plurality of rods mounted at and extending between the shoulder blocks to extend through the jacket block.

At least a part, optionally including a surfacing coating of the brace and the jacket block are preferably formed from the same heat resistant refractory material and are positioned in tight fitting engagement against one another. Accordingly, differential thermal expansion of the jacket block and brace is minimised (due to the choice of material) enabling the electric heater for high heating temperatures up to 1200° C.

The hollow bores or channels of the jacket elements are preferably adapted in cross-section to the size of the external cross-section of the heating element. In the case of a normal heating wire with circular cross-section, the bores or channels each comprise a circular cross-section so as to provide a uniform annular gap (along the axial length of each bore) which facilitates heating of the gas to temperatures up to and around 1200° C. without any undue overheating or stress at the heating element. The cross-section of these bores or channels can in one embodiment also comprise spacers along the perimeter in order to centre the heating element in the bore perpendicular to the longitudinal axis.

Reference within the specification to 'heating element' encompasses relatively thin wires and larger cross sectional heating rods. Such a heating rod or wire preferably comprises an iron-chromium-aluminium (Fe—Cr—Al) alloy or a nickel-chrome-iron (Ni—Cr—Fe) alloy. Thin wire with a small cross section is suitable providing it is sufficiently rigid and stable to extend linearly along the axis of each bore.

In many practical cases the maximum internal spacing between the heating element and the internal facing surface that defines each bore or each channel is between 0.2 and 2 mm, but may also fall within a broader range between 0.02 mm and 50 mm. Optionally, a thicker heating element could in turn comprise a bundle of individual rods or wires which are optionally intertwined or twisted together. With such embodiments, the above-mentioned internal spacing is defined by the internal spacing between the bundle of rods or wires relative to the inner surface that defines each longitudinal bore or channel.

Reference within the specification to 'casing' encompasses those components of the electric heater that are positioned around the internally mounted heating assembly (that comprises the heating element(s) and the jacket block). Such components may include, support struts, inner or outer sheaths or housings, support braces (both internal and external at the heater), bar, rods, spokes, spacing or support flanges and the like. Optionally, the casing may comprise a generally cylindrical sheath encapsulating the heating assembly.

Optionally, a diameter of each of the bores or each of the channels may be in a range 1 mm to 20 mm or even 0.5 mm to 60 mm. Accordingly, a preferred ratio between the cross-sectional area of the rod and the internal cross sectional area of each of the bores/channels may be in the range 0.04 to 0.95, 0.04 to 0.8, 0.04 to 0.9, 0.1 to 0.95, 0.2 to 0.95, 0.3 to 0.8 or 0.5 to 0.9.

The heating element extends through each bore or each channel from an inlet opening to an outlet opening. Gas to be heated flows through the bores or channels and along the heating element. The inner cross-section over the length of the bores or channels needs not to be constant, even though that is preferred, in order to produce a substantially constant clearance gap, in particular a constant annular gap between the heating element and the inner surface of each bore or each channel. Each bore may comprise inner projections, which are distributed along and around the inner surface in order to keep the heating element a fixed distance from the remainder of the bore surface. A substantially constant annular gap along at least 60% of the axial length of each bore or channel is achieved with the exception of the projections engaging the heating element.

The jacket elements may each have any polygonal cross-section. In that respect, it would be possible to use a tube of hexagonal or orthogonal cross-section or any other external polygonal contour for forming a common flat and planar part of an external surface. In particular, an equal sided square or triangular external contour of the jacket elements permits a highly compact assembly arrangement of the jacket elements, wherein braces may extend along flat surface portions formed by the outer side faces of jacket elements within the assembly as described herein. As a result, any displacement in the longitudinal direction of the common axis as well as lateral deflection (a direction perpendicular thereto) is prevented as providing at least a portion of the brace engages an external surface and/or an inner region of the jacket elements/jacket block.

It is also possible to use jacket elements of different polygonal cross-sections in the same array in order to enhance the compactness and stability against displacement relative to the common axis. In one embodiment of the present invention, the jacket elements in a top view on the end faces and along the common axis, form a honeycomb structure.

Optionally the array of jacket elements may form a rectangular cuboid. At least the outer side faces of the jacket elements form an envelope surfaces of the assembly preferably is in touching engagement with at least a part of brace. In an embodiment of the present invention, all jacket elements of an array have the same rectangular cross-section and in particular have an equal sided square cross section to form a rectangular array (in plan view along the (common) axis of the jacket elements).

Optionally, each of the jacket elements comprise at least one groove indented on at least one of its side faces and aligned perpendicular to the axis of the jacket element. In one embodiment, the jacket elements comprise grooves on multiple (e.g., different, opposite or adjacent) side faces that may be axially aligned or offset with respect to each other. Preferably, the groves are provided on diametrically opposite, parallel oriented side faces and are located at the same axial position. In another embodiment of the present invention, the bracing rods are fixed against displacement along the bores by an aligned set of grooves.

Optionally, the rods are guided through or fixed in a corresponding brackct brace mated with a part of the external surface of the heating assembly (the jacket elements), the braces being fixed to the casing directly or indirectly via a spacer. Optionally, the braces may be formed integrally with the spacer(s) and/or the casing. Optionally, the rods are formed integrally with the brackcts braces, the spacers or the casing.

Optionally, each jacket element may comprise a rib, ridge, projection or tongue spaced apart from a corresponding groove or recess at the external surface so as to allow the jacket elements to inter-fit or tessellate with one another in an interlocking relationship. Such an arrangement is advantageous to inhibit lateral movement of the jacket elements to form a secure assembly referred to herein as the jacket block. Optionally, the respective projections and recesses/grooves may extend lengthwise along each of the jacket elements between the respective first and second ends. Optionally, the respective projections and recesses/grooves may extend widthwise or laterally across the jacket elements perpendicular to the elongate bores. Optionally, the jacket elements may be tessellated together via corresponding curved or polygonal cross sectional profiles having cooperating shapes such that the external surfaces of the jacket elements are positioned in close fitting contact with one another substantially along their full axial length. As indicated, optionally, the jacket block may be formed as a single body comprising a plurality of parallel elongate bores extending between the first and second lengthwise ends of the jacket block.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
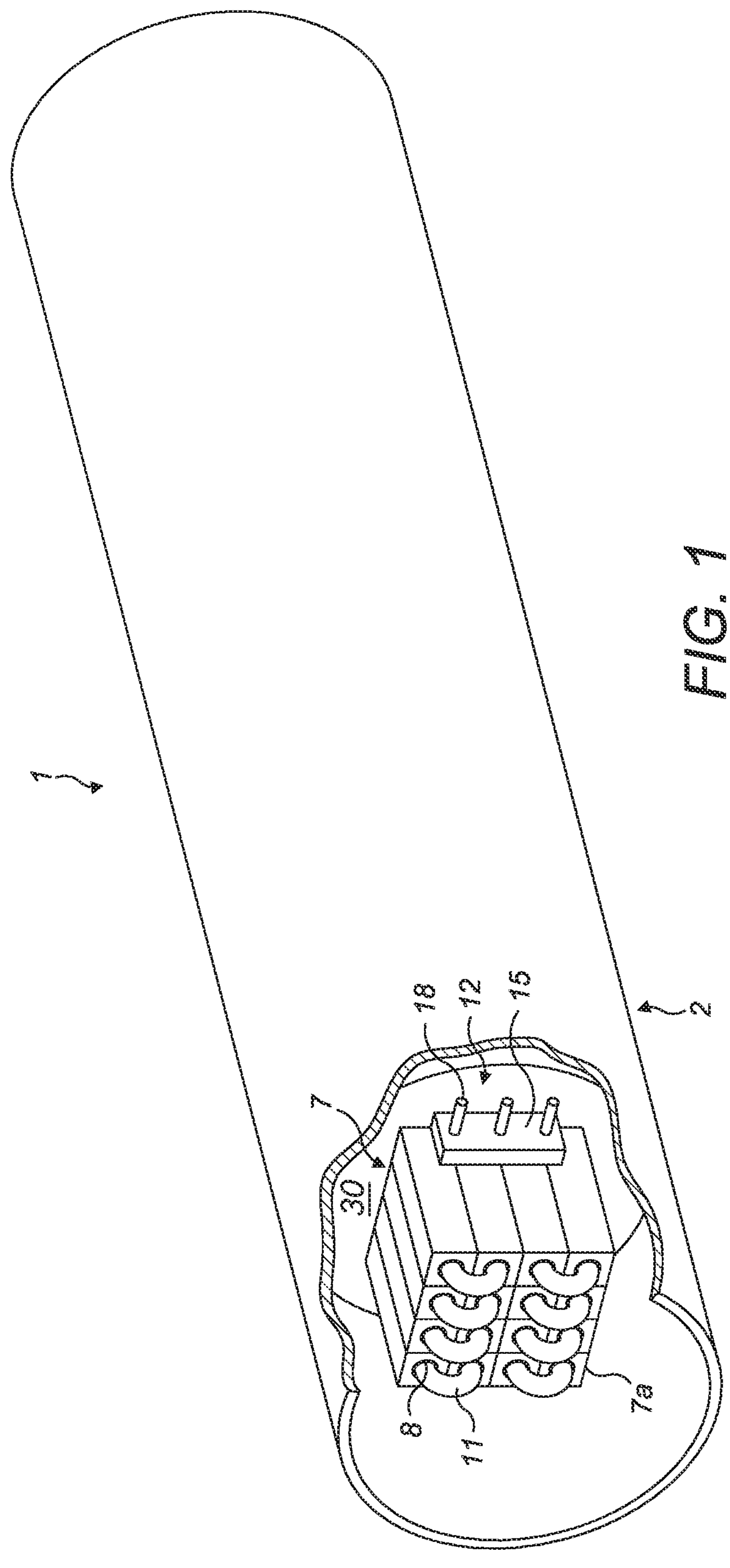
FIG. 1 is a perspective view of a part of an electric heater according to one aspect of the present invention.
Figure 2:
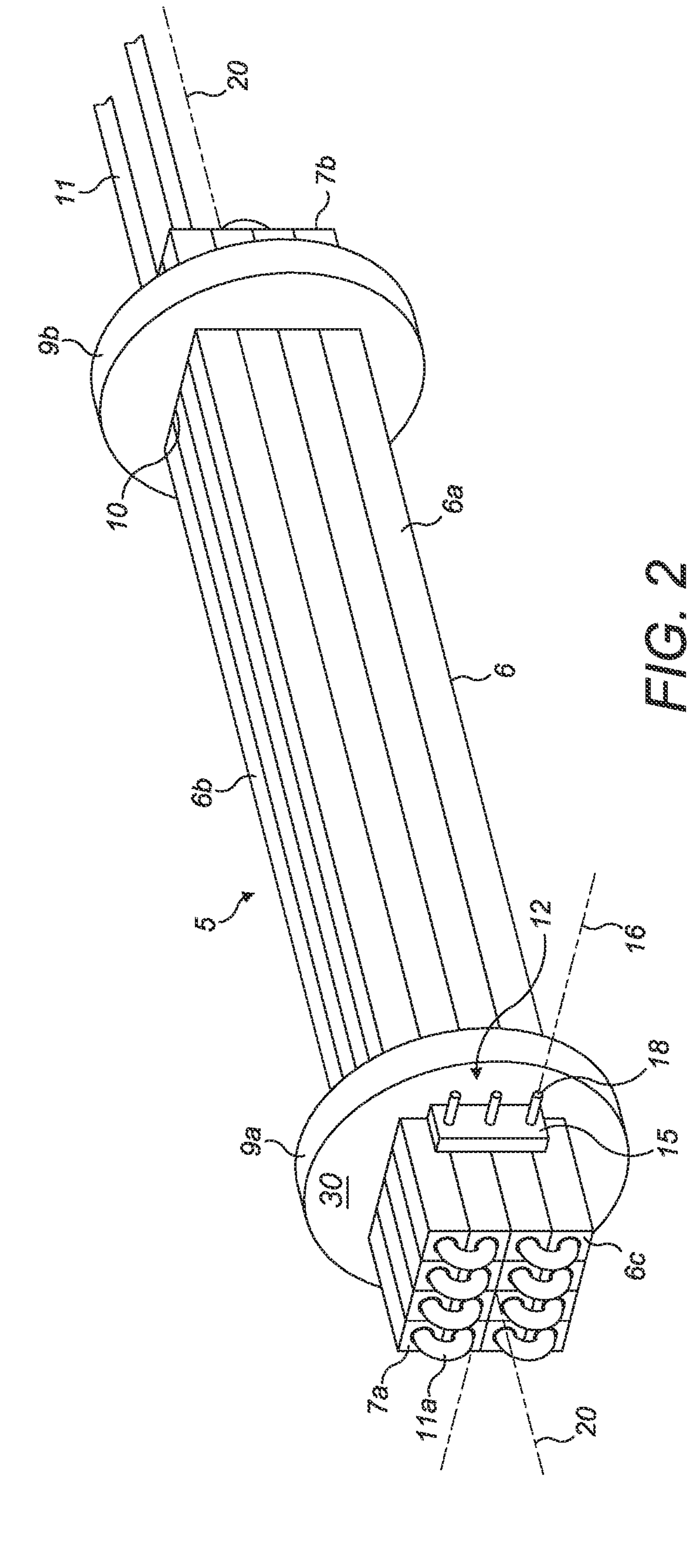
FIG. 2 is a perspective view of a heating assembly forming a part of the electric heater of FIG. 1.
Figure 3:
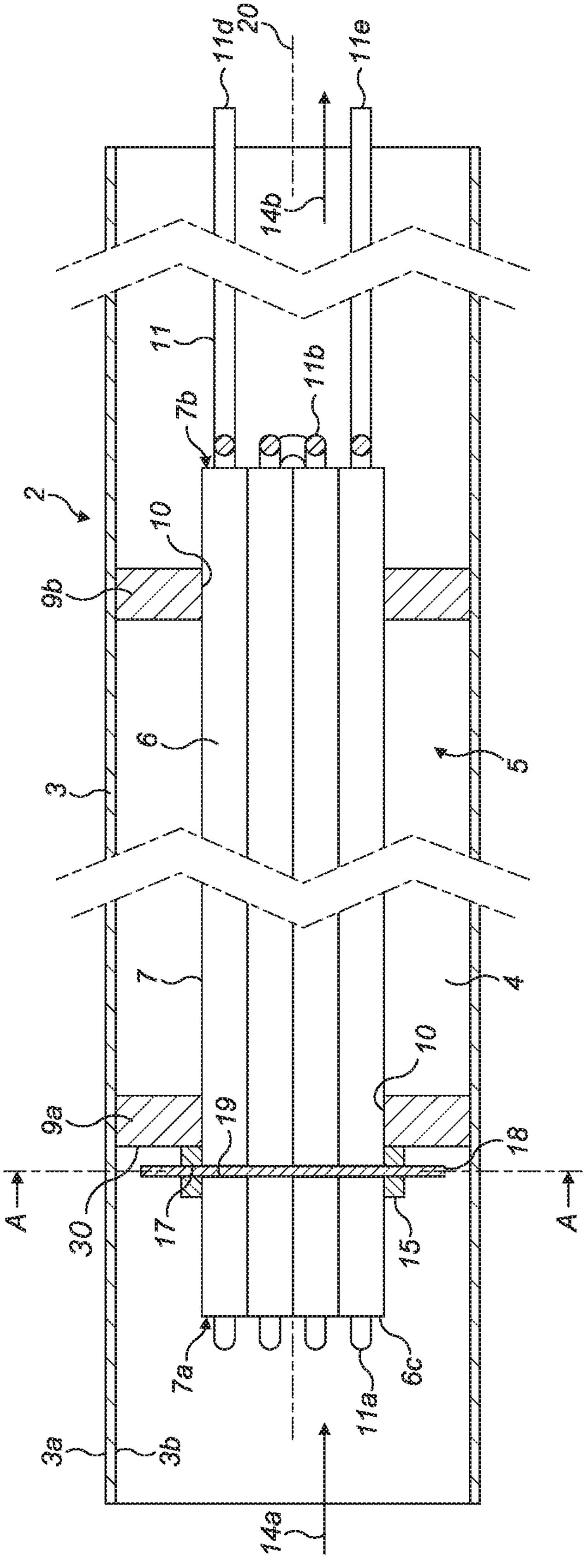
FIG. 3 is a cross sectional side view of the part of the electric heater of FIG. 1.

Referring to FIGS. 1, 2 and 3 an electric heater 1 comprises a casing 2 in a form of a cylindrical sheath 3 (having internal and external facing surfaces 3*b*, 3*a* respectively) that defines an internal chamber 4 open at both axial ends. A heating assembly indicated generally by reference 5 is mounted within chamber 4. Heating assembly 5 is formed from a plurality of lengthwise elongate jacket elements 6 assembled and held together to form a lengthwise elongate jacket block 7. Each elongate jacket element 6 comprises a lengthwise extending longitudinal internal bore 8 extending the full length of each jacket element 6 so as to be open at a first and second axial end 7*a*, 7*b* of the jacket block 7. The jacket element 6 and jacket block 7 are formed as hollow bodies in which the solid mass and volume extends continuously between the first and second axial ends 7*a*, 7*b*. That is, the jacket elements 6 and jacket blocks 7 are not discontinuous between respective ends 7*a*, 7*b*. Such an arrangement is advantageous to maximise the extent and efficiency of thermal energy transfer within the respective jacket elements 6 as explained in further detail herein.

Jacket block 7 is mounted in position (within casing 2) via a pair of disc-shaped spacers 9*a*, 9*b* positioned in a lengthwise direction towards each jacket block axial end 7*a*, 7*b*. Sheath 3 and spacers 9*a*, 9*b* may be formed from metal such that spacers 9*a*, 9*b* are secured to an internal facing surface 3*b* of sheath 3 via welding. Each spacer 9*a*, 9*b* comprises a central aperture 10 having a rectangular shape profile and dimensioned to accommodate jacket block 7 that also comprises an external generally cuboidal shape profile. Accordingly, jacket block 7 is mounted within each spacer aperture 10 so as to be suspended within chamber 4 and spatially separated from sleeve internal facing surface 3*b*.

A heating element indicated generally by reference 11 is formed as an elongate rod having respective ends 11*d*, 11*e* projecting generally from one of the axial ends of jacket block 7. Ends 11*d*, 11*e* are illustrated in FIGS. 1 to 3 projecting from the 'hot' end 7*b* of the jacket block 7 for illustrative purposes. Ends 11*d*, 11*e*, preferably extend from the 'cool' end 7*a* of jacket block 7. Heating element 11 comprises a generally circular cross sectional profile and is dimensioned slightly smaller than the cross sectional area of each jacket element bore 8. The single heating element 11 is adapted to extend sequentially through each elongate bore 8 of the jacket block 7 via respective bent axial end sections 11*a* and 11*b*. In particular, heating element 11 emerges from one bore 8 of a first jacket element 6 is bent through 180° (heating element end section 11*a*) so as to return into an adjacent or neighbouring bore 8 at the jacket block first axial end 7*a*. This is repeated at the jacket block second axial end 7*b* via bent end sections 11*b*. Heating element ends 11*d*, 11*e* are capable of being coupled to electrical connections to enable a current to be passed through element 11 as will be appreciated.

Figure 5:
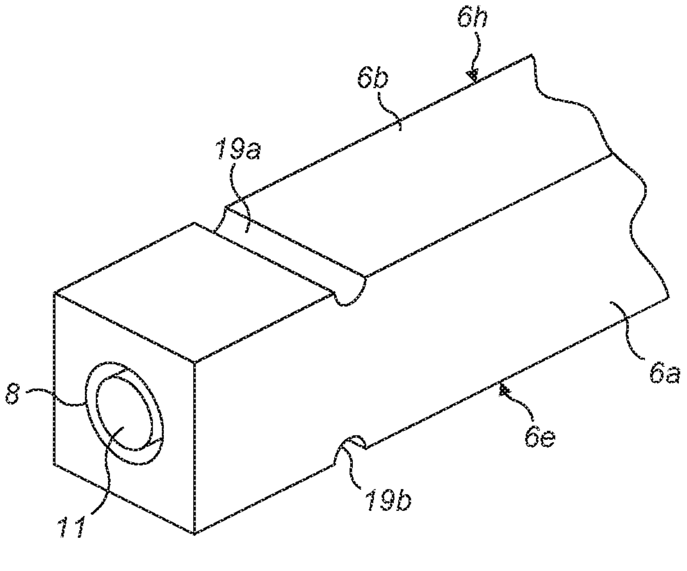
FIG. 5 is a perspective view of a portion of a jacket element and heating element forming part of the heating assembly of FIG. 2.
Figure 6:
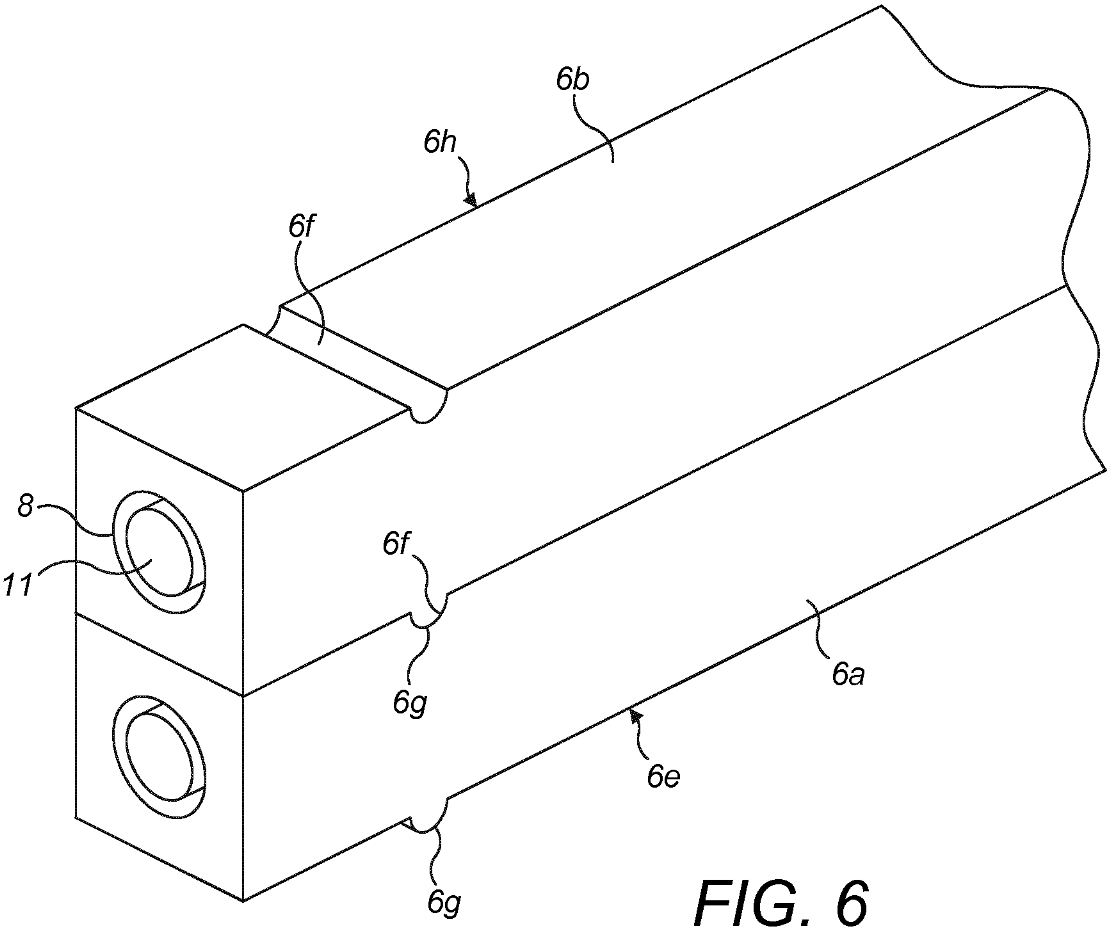
FIG. 6 is a further perspective view of a pair of jacket elements assembled together in close fitting contact.

Referring to FIG. 6, each jacket element 6 comprises four longitudinal extending side faces 6*a*, 6*b*, 6*e* and 6*h* that are generally planar such that each jacket element comprises an external generally square cross sectional shape profile adapted to enable the jacket elements to sit together in touching contact to form a rectangular cuboidal unitary body in which the individual side faces of the jacket elements 6 form the external facing surfaces of the jacket block 7. A small gap is provided between each spacer aperture 10 and the external surfaces of jacket block 7 (defined by jacket element side faces 6*a*, 6*b*, 6*e*, 6*h*). Such gaps accommodated differential thermal expansion of the spacers 9*a*, 9*b* (typically formed from metal) and the jacket elements 6 that are preferably formed from a non-electrically conducting refractory material. However, at least some structural support of the jacket block 7 and heating element 11 is provided by spacers 9*a*, 9*b* (via apertures 10) that are at least partially in contact with jacket block 7. To inhibit axial and lateral movement of each of the individual jacket elements 6 (relative to a longitudinal axis 20 extending through heater 1), each jacket element 6 comprises a groove 6*f* and a corresponding rib 6*g* extending laterally across jacket elements 6 and perpendicular to axis 20. The grooves 6*f* and ribs 6*g* of neighbouring jacket elements 6 are adapted to inter-fit one another to provide a part-tessellating jacket block 7 resistant to axial loading forces and lateral shear forces. The groove and rib arrangement (6*f*, 6*g*) of FIG. 5 is complementary to the positional holding of the heating assembly 5 via spacers 9*a*, 9*b*.

Figure 4:
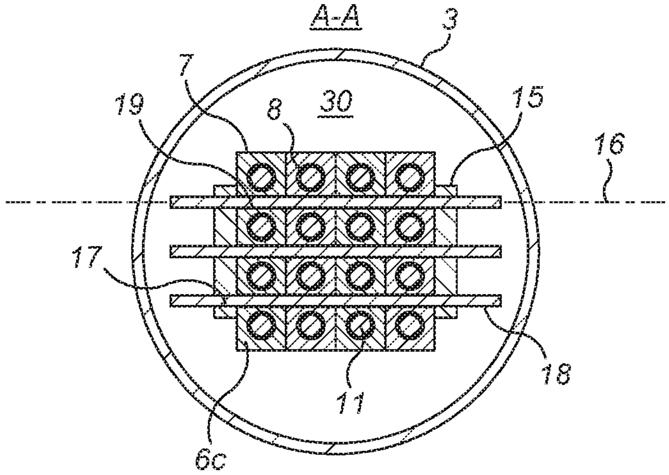
FIG. 4 is a cross section through A-A of FIG. 3.

Referring to FIGS. 2, 3 and 4, the present electric heater is specifically configured with at least one brace indicated generally by reference 12 (alternatively termed a heating assembly stabilisation unit) configured to positionally stabilise the heating assembly 5 (that encompasses the jacket block 7 and the heating element 11) within the electric heater 1 and in particular relative to the casing 2. Such an arrangement is advantageous to minimise independent movement of the heating assembly 5 within the heater 1 and with respect to the casing 2.

As will be appreciated, the dimensions of the heating element 11 and bores 8 are carefully controlled to achieve a desired small separation gap between the inward facing surface of each bore 8 and the external surface of heating element 11. Such an arrangement is advantageous to maximise the effectiveness and efficiency of heat energy transfer from element 11 to a flow of a gas phase medium initially introduced as an inlet flow 14*a* into the chamber 4 at axial end 7*a* to then flow through each of the bore 8 and exit from the heating assembly 5 at axial end 7*b* as an exit flow 14*b*. When the electric heater 1 is suspended vertically in use, undesirable contact between the bent end sections 11*a*, 11*b* and the end faces 6*c*, and in particular the annular edges that define the entry and exit end of each bore 8, contribute to fatigue and damage to the heating element 11 and a corresponding reduction in the service lifetime of the heater 1. To mitigate this, brace 12 is specifically adapted to inhibit and in particular to prevent any independently axial and lateral movement of the jacket block 7 relative to the heating element 11.

Advantageously, brace 12 is positioned at or towards a ‘cool’ axial end (closer to ambient temperature) of the heating assembly 5 corresponding to the gas inlet flow 14*a* relative to a ‘hot’ axial end (at temperatures of up to 1200° C.) for heated gas outflow 14*b*. The ‘cool’ first axial end 7*a* is the region of lower stress (lower temperature differential) relative to the second axial end 7*b* and therefore stabilisation towards the first axial end 7*a* is more practical and effective.

Referring to FIGS. 4 and 5, brace 12 comprises a pair of spaced apart shoulder blocks 15 that are secured to a front face 30 of spacer 9*a* so as to project forwardly into the oncoming gas flow 14 *a*. Boreholes 17 extend through each shoulder block 15 along axis 16 extending perpendicular to main longitudinal axis 20 of the heater 1. An elongate rod (or bar) 18 is mounted within each borehole 17 to be centred on axis 16 and to extend between each of the opposed shoulder blocks 15 and laterally through jacket block 7. The present invention comprises a plurality of stabilisation rods 18 each extending through jacket block 7, parallel to one another and perpendicular to the main longitudinal axis 20.

Each jacket element 6, in addition to the rib and grooves 6*g*, 6*f* of FIG. 6, also comprises an additional pair of grooves 19*a*, 19*b* located at a different axial position along the length of each jacket element 6 relative to the rib and grooves 6*g*, 6*f* of FIG. 6. Referring to FIG. 5, grooves 19*a*, 19*b* are provided at diametrically opposite side faces 6*b*, 6*e* at the same axial position along the length of jacket element 6 to extend laterally across jacket element 6 perpendicular to main axis 20. Each groove 19*a*, 19*b* comprises a semi-circular cross sectional profile (relative to axis 16) to correspond to a portion of the external surface of a rod 18. Accordingly, when the jacket elements 6 are arranged together to form the array (jacket block 6), as illustrated in FIG. 4, the grooves 19*a*, 19*b* of neighbouring jacket elements 6 align so as to define channels 19 (alternatively termed boreholes) of circular cross section. The channels 19 extend laterally through jacket block 7 and are configured to accommodate a respective rod 18. Channels 19 are positioned laterally to the side of the main bores 7 so as to not interfere with the bores 7 and the electrically conducting heating element 11. According to the preferred specific implementation, each rod 18 comprises a metallic core surrounded by a refractory coating. Such an arrangement is advantageous to minimise any differential thermal expansion of the rods 18 and jacket block 7. Accordingly, the present electric heater via shoulder blocks 15 is configured to stabilise the heating assembly 5 at the external surface region 6*a*, 6*b*, 6*e*, 6*h* and also to provide stabilisation via internal contact of the jacket block 7 via rods 18.

Whilst the electric heater is illustrated and described comprising a single pair of shoulder blocks 15 and a corresponding first set of rods 18, the heater 1 may, according to further specific implementations, comprise multiple pairs of shoulder blocks 15 and sets of rods 18. Such additional pairs and sets may be provided at different regions along the axial length of the heating assembly 5 between axial ends 7*a*, 7*b*. Such arrangements would be advantageous to stabilise the heating assembly 5 along its axial length. Alternatively, the multiple pairs and sets of braces 12 may be located towards the ‘cool’ end (7*a*) of the gas inlet flow 14*a*.

The present electric heater having an axially and laterally stabilised heating assembly 5 is configured with an extended operation lifetime via minimised independent movement of the jacket block 7 relative to heating element 11 and casing 2. The effectiveness and efficiency of heat energy transfer within the present electric heater is provided by the heating elements 6 extending continuously lengthwise (axially) between respective ends 7*a*, 7*b*. In particular, heating element 11 is entirely and continuously housed, covered and contained by the elongate jacket elements 6 between ends 7*a*, 7*b*.

As will be appreciated, whilst the subject invention is described with reference to shoulder blocks 15 and elongate rods 18 inserted through jacket block 7, the same stabilisation may be achieved via alternative components and arrangements in which an external and/or internal region of jacket block 7 is contacted by at least one or more abutment components and/or members that are secured, either directly or indirectly to casing 2 (for example via intermediate spacers 9*a*, 9*b*). For example, such abutment components may comprise flanges, projections, eyelets, hook shaped members, plates, sheaths, wires, cables, pins, mesh, grids or washers adapted for abutment contact at the external and/or internal regions of the jacket block 7.

The invention claimed is:

1. An electric heater to heat a flow of a fluid, comprising:

at least one axially elongate jacket element defining an axially elongate jacket block having first and second lengthwise ends;

a plurality of longitudinal bores or channels extending internally through the jacket block and being open at each of the respective first and second lengthwise ends;

at least one heating element extending axially through the bores or channels, the at least one heating element and the jacket block forming a heating assembly;

a casing positioned to at least partially surround the heating assembly, wherein at least one brace is connected to or projecting from the casing to contact the jacket block to inhibit axial and/or lateral movement of the jacket block relative to the casing.

2. The electric heater as claimed in claim 1, wherein the casing comprises an outer sheath that surrounds the heating assembly and the at least one brace extends radially between the sheath and the jacket block.

3. The electric heater as claimed in claim 2, wherein the casing further comprises at least one spacer extending radially from the sheath and towards the jacket block, the brace mounted at or extending from the spacer to contact the jacket block.

4. The electric heater as claimed in claim 3, wherein the brace comprises a plurality of rods extending into and through the jacket block at regions between the longitudinal bores or channels.

5. The electric heater as claimed in claim 4, wherein the brace comprises a shoulder block positioned at or towards a radially inner region of the spacer.

6. The electric heater as claimed in claim 5, wherein the brace comprises at least a pair of the shoulder blocks positioned at opposite lateral sides of the jacket block and the rods are mounted at and extend between the shoulder blocks to extend through the jacket block.

7. The electric heater as claimed in claim 6, comprising:

at least a first pair of shoulder blocks positioned at lateral sides of the jacket block; and a first set of the rods extending through and across the jacket block between the shoulder blocks and a second set of the rods extending through the jacket block perpendicular to the first set of the rods.

8. The electric heater as claimed in claim 6, comprising:

a first pair of shoulder blocks and a first set of the rods extending through the jacket block; and a second pair of the shoulder blocks and a second set of the rods extending through the jacket block, wherein the second pair of shoulder blocks are positioned at different lateral sides of the jacket block relative to the first pair and the second set of rods extends generally perpendicular to the first set of the rods.

9. The electric heater as claimed in claim 8, wherein the first pair of shoulder blocks and the second pair of shoulder blocks are positioned at different regions along a length of the jacket block between the lengthwise ends.

10. The electric heater as claimed in claim 5, wherein the jacket block comprises a plurality of channels extending generally perpendicular to the longitudinal bores or channels to receive the rods.

11. The electric heater as claimed in claim 1, comprising a plurality of jacket elements assembled together as a unitary body.

12. The electric heater as claimed in claim 10, comprising a plurality of jacket elements assembled together as a unitary body, wherein each of the jacket elements comprise at least a first and second groove indented in external surfaces of the jacket element such that the first and second grooves of neighbouring or adjacent jacket elements align to define one of the respective channels to receive one of the respective rods.

13. The electric heater as claimed in claim 12, wherein each of the jacket elements comprise a projection at a first region and a groove at a second region of at least one external surface, the projection of one of the jacket elements configured to at least partially sit within the groove of an adjacent jacket element to at least partially interlock the jacket elements.

14. The electric heater as claimed in claim 11, wherein each of the jacket elements comprise a polygonal or rectangular outer cross sectional profile.

15. The electric heater as claimed in claim 13, wherein each of the jacket elements comprise a polygonal or rectangular outer cross sectional profile, and wherein the projection and the groove are provided at different side faces of each respective jacket element.

16. The electric heater as claimed in claim 3, wherein the brace comprises a plurality of rods extending into and through the jacket block at regions between the longitudinal bores or channels, and wherein each of the spacers comprises a part-disc shaped member having a central aperture through which a part of the jacket block extends.

17. The electric heater as claimed in claim 16, wherein the casing comprises a generally cylindrical sheath encapsulating the heating assembly.

18. The electric heater as claimed in claim 17, wherein the spacers are attached to a radially inner surface of the sheath.

19. The electric heater as claimed in claim 1, comprising a plurality of the jacket elements assembled together in touching contact with one another to define the elongate jacket block, each of the plurality of longitudinal bores or channels extending respectively through each of the jacket elements; and the brace comprises at least a pair of shoulder blocks positioned at opposite lateral sides of the jacket block and a plurality of rods mounted at and extending between the shoulder blocks to extend through the jacket block.

* * * * *